May 28, 1929.  E. A. SPERRY, JR  1,715,311
MULTISTEP REPEATER MOTOR
Filed Sept. 29, 1922
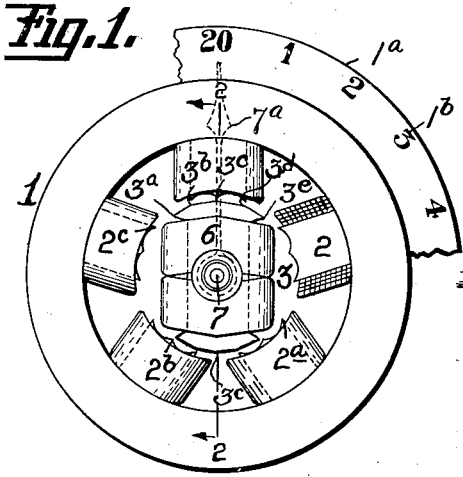
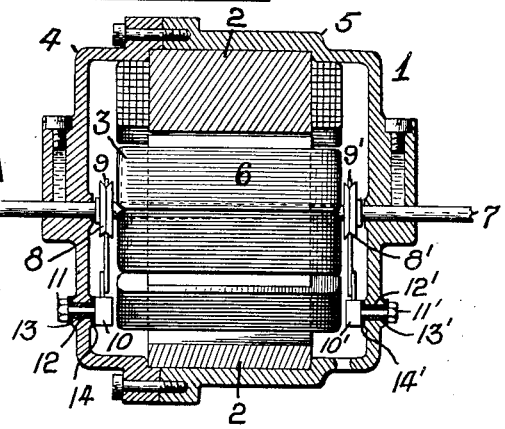
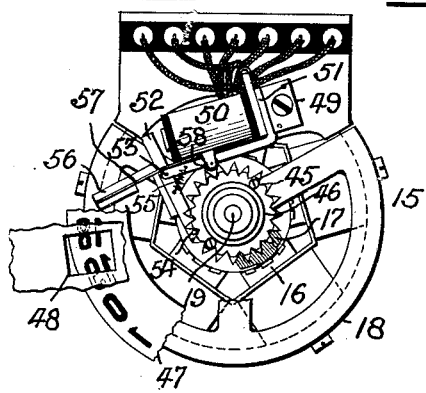
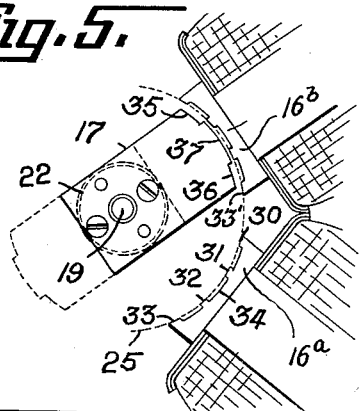
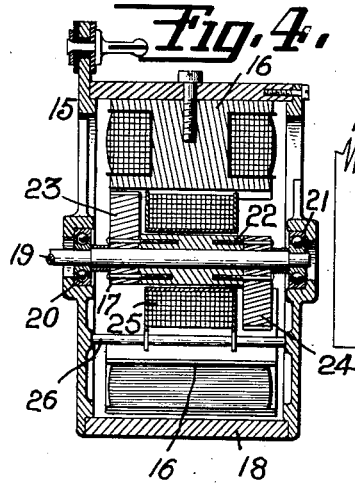
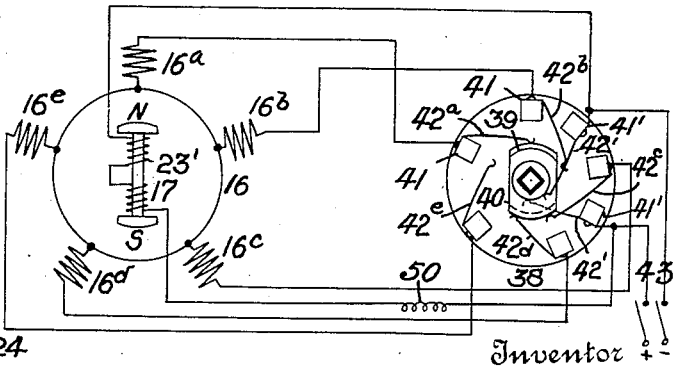
Inventor
Elmer A. Sperry, Jr.
By Herbert H. Thompson
Attorney Patented May 28, 1929.

1,715,311

UNITED STATES PATENT OFFICE.

ELMER A. SPERRY, JR., OF BROOKLYN, NEW YORK, ASSIGNOR, BY MESNE ASSIGNMENTS, TO THE SPERRY GYROSCOPE COMPANY, INC., A CORPORATION OF NEW YORK.

MULTISTEP REPEATER MOTOR.

Application filed September 29, 1922. Serial No. 591,206.

This invention relates to transmission systems for positioning an indicator or other device in accordance with the position of a remotely located element, and the present application is a continuation in part of my pending application, Serial No. 397,968, filed July 21, 1920, which pending application is assigned to the assignee of the present application.

More particularly, this invention relates to repeater motors employed in such systems, and has for its object the provision of means for obtaining clear cut definition of steps in the step by step rotation of the armature. This result I accomplish by localizing the magnetic flux in each position the rotatable element may assume. Such localization is obtained by so forming the face of the field poles and of the armature, with projections, or points, as to constitute auxiliary poles or points of maximum flux concentration for the different relative positions of the armature and pole faces.

My invention will be better understood from the following description taken in connection with the accompanying drawings, and its scope will be pointed out in the appended claims.

In the drawings, illustrating what I now consider the preferred forms of my invention;

Fig. 1 is a plan view, partly in section, of an improved form of repeater motor, the top section of the motor casing being removed.

Fig. 2 is a vertical section on line 2—2 of Fig. 1,

Fig. 3 is a plan view of a modified form of repeater motor with parts broken away, embodying my invention, Fig. 4 is an enlarged vertical section of Fig. 3, Fig. 5 is an enlarged detail view of a part of Fig. 3 to more clearly illustrate applicant's invention, and Fig. 6 is a wiring diagram of a transmission system in which the present invention may be employed.

Referring now to the drawings, in which the numeral 1, in Figs. 1 and 2 indicates a repeater motor, comprising a plurality of field poles 2, of which five are shown, and a rotatable armature 3. Said poles and armature are shown mounted in a casing consisting of sections 4 and 5 bolted or otherwise secured together in any suitable manner. The armature may be shown provided with a winding 6 and is mounted on a shaft 7 rotatably journaled in the end portions of sections 4 and 5, respectively. For leading current to windings 6, slip rings 8, 8' are shown on shaft 7, which rings are engaged by spring contact brushes 9, 9', similar in construction and carried by suitable metal blocks 10, 10', secured to the casing sections 4 and 5, respectively, by bolts 11 and 11' respectively. These bolts are insulated from the motor casing wall by an annular member 12, washers 13, 14 and similar members 12', 13' and 14' respectively. By these means, current may readily be led through the casing section 4 to brush 9 and in a similar manner through section 5 to brush 9'. Since the motor shown is a twenty-step motor, such as is disclosed in the aforementioned application, an indicator card $1^a$ having twenty index references $1^b$ is provided, and a pointer $7^a$ is carried by the motor shaft 7 to cooperate with said card.

In practice, it is found that when the armature 3 moves through a given step, it may occupy any one of a plurality of slightly different angular positions in which the action of the repeater motor is substantially the same. In order to assure a clear cut definition of steps in the step by step rotation of the armature 3, that is, to insure that said armature will positively assume but one position for each step, the faces of the poles and the armature are so shaped as to accomplish a sharp definition. As shown in Fig. 1, the pole pieces 2 are provided on their faces with projectors $2^a$, $2^b$, and $2^c$, and the armature 3 is likewise provided with projections $3^a$, $3^b$, $3^c$, $3^d$ and $3^e$, which projections serve as points for concentrating the magnetic flux and cooperate to prevent armature 3 from assuming more than one definite position for each step, since for each step of armature 3, the projections on the armature assume a definite position with respect to the cooperating field poles. This operation will be more fully described hereinafter.

While the armature 3 may be provided with a winding 6 rotatable therewith as shown in Figs. 1 and 2, a repeater motor embodying my invention may assume other forms in which the armature may have no winding, or it may be as shown in Figs. 3, 4 and 5, in which the winding is fixed. In the latter three figures is shown a repeater motor, certain features of the construction of which form no part of my invention, this being claimed in the co-pending joint application of R. E. Kortepeter and A. A. Amundsen, Serial No. 519,058, filed December 1, 1921, for repeater motor indicators, which application is also assigned to the assignee of the present application. The motor shown in Figs. 3, 4 and 5, however, embodies my invention, clearly shown in Fig. 5, from which it will be seen that the projections may assume various forms.

Referring to Figs. 3, 4 and 5, the numeral 15 indicates a repeater motor having a plurality of poles 16, such as five, and a rotatable armature 17. Said poles and armature are shown mounted in a casing 18. The armature 17 is fixed to a shaft 19 in any suitable manner, which shaft is supported in suitable bearings 20, 21 in the casing 18. As shown in Fig. 4, the armature 17 consists of a cylindrical member 22, fixed on the shaft 19 in any suitable manner, having secured at each end an oppositely extending arm 23 and 24, respectively, of magnetic material. A winding 25 for the armature 17 surrounds the member 22 and is rigidly supported within the casing 21 in any suitable manner, such as by a cross-bar 26. It will thus be seen that the armature 17 may rotate independently of its winding 23. The poles 16 are shaped with a plurality of teeth 30, 31, 32, 33, which are separated by cut away portions 34, to localize the magnetic flux, and thereby obtain clear cut definition of steps, as will be fully described hereinafter. The armature 17 may be formed with reduced end portions 35 and 36, thus providing a central portion 37 of greater radius than the end portions.

While my invention may be employed in repeater motors of any type, it is of particular value where it is desired to stop the armature at two or more points between a given pair of poles, such for example, where twenty steps may be obtained with a five pole motor. I have for this reason shown five pole motors with polarizing coils, the operation of which may be briefly described in connection with Fig. 6, this system however being claimed in my parent case.

In Fig. 6, I have shown connections between a transmitter 38 and repeater motor 16, which could be of either type shown in Fig. 1 or Fig. 3, whereby 20 steps per revolution of the armature 17 may be obtained. The field windings $16^a$, $16^b$, $16^c$, $16^d$, and $16^e$, are all connected together at one end, and each of said windings is connected at its other end to a respective one of posts 41 and brushes 42. In this figure I have designated the brushes 42 as $42^a$, $42^b$, $42^c$, $42^d$, and $42^e$, according to the particular field coil to which each brush is connected. The direct current mains 43 are connected to posts 41' and brushes 42', which posts and brushes are also connected with the terminals of the armature winding 23', which winding is shown as wound on the armature 17, although the winding could be arranged as shown in Fig. 4. In this manner, the armature 17 is constantly polarized. By so arranging the members 39 and 40, which are insulated from each other and constitute the rotatable element of the transmitter 38, and the brushes 42, that as said element is turned, brushes 42 are alternately bridged by twos and threes in the proper sequence, I am enabled to obtain twenty steps of armature 17 per revolution. Thus when the members 39 and 40 are in the position shown in Fig. 6, so that brushes $42^a$, $42^c$, and $42^d$ are bridged by said members and current is caused to flow through coil $16^a$ in such direction as to make the latter a south pole, and through coils $16^c$ and $16^d$ in such direction as to make the latter north poles, armature 17 will occupy the position shown. If, now, said transmitter rotatable element is turned in a clockwise direction a sufficient distance from its position in Fig. 6, brush $42^c$ will no longer engage member 40, and repeater field coils $16^a$ and $16^d$ alone will be energized. Armature 17 will thereupon move until the forces exerted by it by coils $16^a$ and $16^b$ are in equilibrium and will accordingly assume a position 18 degrees in a clockwise direction from its position in Fig. 6. The members 39 and 40 are so designed and brushes $42^a$ to $42^e$ so positioned that by the time the transmitter rotatable element has moved through 18 degrees, contact with a brush will be made or broken and the number of repeater poles energized will be changed. Thus, by the time said rotatable element has turned clockwise through 18 degrees from its position in Fig. 6, contact with brush $42^c$ will have been broken. On the other hand, by the time that said element has been rotated in a counter-clockwise direction through 18 degrees from its position in Fig. 6, contact with brush $42^d$ will have been broken, and armature 17 will consequently have assumed a position 18 degrees in a counter-clockwise direction from its position in Fig. 6.

As said element is rotated through 180 degrees in a clockwise direction from its position in Fig. 6, the repeater field poles will be energized as follows; poles $16^a$ and $16^d$; poles $16^a$, $16^b$, and $16^d$; poles $16^b$ and $16^d$; poles $16^b$, $16^d$, and $16^e$; poles $16^b$ and $16^e$; poles $16^b$, $16^c$, and $16^e$; poles $16^c$ and $16^e$;

poles 16ᶜ, 16ᵉ, and 16ᵃ; poles 16ᶜ and 16ᵃ; and poles 16ᵃ, 16ᶜ, and 16ᵈ. With segments 39 and 40 moved through 180 degrees, it will now be noted that the flow of current through poles 16ᵃ, 16ᶜ, and 16ᵈ, is reversed so that pole 16ᵃ becomes a north pole, thereby attracting the S end of armature 17, and poles 16ᶜ and 16ᵈ, become south poles and attract the N end of said armature. Continuing the rotation of the transmitter element clockwise through 180 degrees more, the poles are energized in the same order as in the first 180 degrees rotation, although the current through them is, of course, reversed. It will thus readily be seen that as the transmitter element is moved through 360 degrees, the armature 17 is caused to make a complete revolution in steps of 18 degrees each.

Since there are but five poles in the repeater motor for obtaining 20 steps, it is obvious that the armature thereof must assume two definite positions between a pair of poles, or in other words, the armature occupies four different positions in advancing over the face of each pole.

To obtain a clear cut definition of steps in the step by step rotation of the armature, the pole pieces and armature are shaped as above described to localize the magnetic flux in each position. With proper proportions then, the repeater motor armature will occupy four positions for each pole. The operation of my invention will readily be understood by referring to Fig. 5, in which a clear cut definition of the four steps is obtained in the following manner.

*First position.*—When approaching the pole marked 16ᵃ, the central portion 37 of the armature will lie with the upper edge thereof in line with the edge of the tooth 33′ of the pole 16ᵇ, the lower edge thereof being substantially in line with the lower edge of the tooth 30 of the pole 16ᵃ.

*Second position.*—The upper edge of the central portion 37 will lie in line with the upper edge of the tooth 30 of the pole 16ᵃ, and the lower edge will lie substantially in line with the lower edge of tooth 31.

*Third position.*—The two edges of portion 37 will be in line with the upper edge of tooth 31 and the lower edge of tooth 32.

*Fourth position.*—The two edges of portion 37 will be in line with the upper edge of tooth 32 and the lower edge of tooth 33.

The repeater motor described may be provided with means for throwing the motor armature out of its step positions when the current is turned off, so that when the current is turned on again, if the transmitter should have been turned through an angle of 180 degrees, the repeater armature will not be held out of synchronism. This may be done by the means described in my parent case, or by the mechanism shown in Fig. 3, in which a star wheel 45 is fixed on the shaft 19, and a second star wheel 46 is carried by said star wheel 45, and loosely mounted thereon to permit a slight relative movement therebetween. An index card 47 is carried by the star wheel 46, adapted to register with any suitable cooperating reference, such as a window 48 in the casing containing the apparatus. Mounted on the top of the motor and secured thereto at 49, is an electromagnet 50. Associated with the electromagnet is a bracket 51 having pivotally attached thereto at 53 a lever 52. Said lever carries a detent 54 at one end thereof which is adapted to engage the star wheel 45. A spring 55 may serve to hold the detent normally in engagement with the star wheel. The rear end of the lever 52 is adjacent the electromagnet 50, constituting the armature therefor. Thus, when the magnet is energized the action of spring 55 is overcome and the detent 54 is disengaged from the star wheel.

On the lever 52, there is suitably fixed a bracket 56 carrying a resilient arm 57, which in turn carries a roller detent 58 adapted to engage the star wheel 46. The detent 58 is so positioned as to be disengaged from wheel 46 when detent 54 is in engagement with the wheel 45, and engaged therewith when detent 54 is disengaged. Since this particular apparatus is designed for a twenty-step motor, the card 47 has twenty references and the wheels 45 and 46 have twenty notches.

In the case of the wheel 46, which is fixed with respect to the reference card 47, the detent 58 is so positioned that when it is lodged in one of the notches of wheel 46, one of the references on said card will register with the window 48. The detent 54 is so positioned, however, that when it is lodged in one of the notches of the star wheel 45, the armature 23 will occupy a position between its operating step positions, and the references on the card 47 will be out of register with the window 48, thus indicating when the repeater motor is in operation.

The points of the star wheel 45 are shown as sharp, while those of the wheel 46 may be cut off as indicated. By this construction it will be seen that whatever position 45 may be in when the detent 54 is brought into engagement therewith by the action of spring 55, the detent will find its way to the bottom of the notches, while the detent 58 may ride easily over the points of the wheel 46 and settle into the notches thereof only when the motor armature is close to one of its step positions.

The electromagnet 50 is preferably in the circuit of the armature winding 25 and is therefore constantly energized to hold the detent 54 out of and the detent 58 in engagement with their respective star wheels, when the apparatus is in operation, and when the apparatus is not in operation, the deenergization of magnet 50 will permit said detents to occupy their opposite positions. In view of the foregoing, a further description of the operation is not believed to be necessary.

As above indicated, applicant's invention may assume different forms. For instance, the pole piece may be shaped with 3 points for localizing the flux, and the armature may have 5 of such points, as shown in Fig. 1, in which a clear cut definition of four steps is obtained in the following manner;

*First position.*—When approaching the pole marked 2, the points $3^b$ and $3^c$ of the armature 3 will lie in line with the points $2^b$ and $2^c$ of the pole 2' respectively, and the point $3^e$ will lie in line with the point $2^a$ of the pole 2.

*Second position.*—When the armature moves through 18 degrees to this position, the points $3^a$ and $3^b$ will lie in line with the points $2^b$ and $2^c$ of the pole 2' respectively, and the points $3^d$ and $3^e$ will lie in line with the points $2^a$ and $2^b$ of the pole 2 respectively.

*Third position.*—When the armature has again advanced through 18 degrees to this position, the point $3^a$ of the armature will lie in line with the point $2^c$ of the pole 2' and the points $3^c$, $3^d$, and $3^e$ will lie in line with the points $2^a$, $2^b$, and $2^c$ of the pole 2, respectively.

*Fourth position.*—When the armature has moved through its next step of 18 degrees, the points $3^b$, $3^c$, and $3^d$ of the armature 3 will lie in line with the points $2^a$, $2^b$ and $2^c$ of the pole 2, respectively.

It will also be obvious to those skilled in the art that the projections formed on the face of the armature could be formed on the pole piece, and those on the pole piece could be formed on the armature without varying the results obtained in any given case.

The total width of the armature and the total width of a pole piece are preferably different, that is, the total width of the armature is preferably greater or smaller than the total width of the pole piece.

The total width of the armature may be somewhat less than the width of the pole piece, as shown in Fig. 5. In this case, the cut away end portions 35 and 36 of the armature aid materially in accurate definition, since while they assist in pulling over the armature from one pole to another, they prevent the hanging or sticking of the armature to the pole which it is leaving by providing sufficient air gap at that point. It is also obvious that the same result may be obtained by making the total width of the armature greater than that of the pole pieces, as shown in Fig. 1.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a repeater motor, a plurality of fixed poles, a rotatable armature, a fixed coil for polarizing said armature, said poles and armature each being provided with a plurality of cut away portions to localize the magnetic flux in a definite position for each position of the armature in passing across the face of the pole and additional mechanical means for aiding sharp step definition.

2. In a repeater motor, a plurality of fixed poles, a rotatable armature, a fixed coil for polarizing said armature, said poles being provided with a number of teeth equal to the number of step positions the armature occupies in passing across said pole, and the armature being provided with cut away end portions providing a central raised part of greater width than the distance between two of said teeth for the purpose specified.

3. In a multi-step repeater motor, a plurality of fixed spaced poles, and a rotatable armature, each of said poles having spaced projections and said armature having reduced end portions providing a central raised portion of greater width than the distance between two adjacent projections on said poles.

4. In a multi-step repeater motor, a plurality of fixed spaced poles, and a rotatable armature of less width than the poles, each of said poles having spaced projections and said armature having reduced end portions providing a central raised portion of greater width than the distance between two adjacent poles.

5. In a repeater motor, a plurality of fixed poles, a rotatable armature, said poles being provided with a number of teeth equal to the number of step positions the armature occupies in passing across said pole, and the armature being provided with cut away end portions providing a central raised part of greater width than the distance between two of said teeth for the purpose specified.

6. In a multi-step repeater motor, a plurality of fixed poles, a rotatable armature, each of said poles having a plurality of spaced teeth equal in number to the step positions the armature occupies in passing across said pole, said poles being spaced from each other a distance approximately equal to a single step of the armature, and said armature being provided with reduced end portions for the purpose specified.

7. In combination, a repeater motor having a field element and an armature element, each of said elements comprising a plurality of poles, one of said elements being rotatable with respect to the other, each of said poles having a plurality of projections, means for passing magnetic flux through said projections, and auxiliary mechanical means for defining the stop positions of the steps.

In testimony whereof I have affixed my signature.

ELMER A. SPERRY, JR.